M. T. CONVERY.
SHOCK ABSORBER.
APPLICATION FILED JUNE 26, 1914.
1,122,694.
Patented Dec. 29, 1914.
2 SHEETS—SHEET 1.
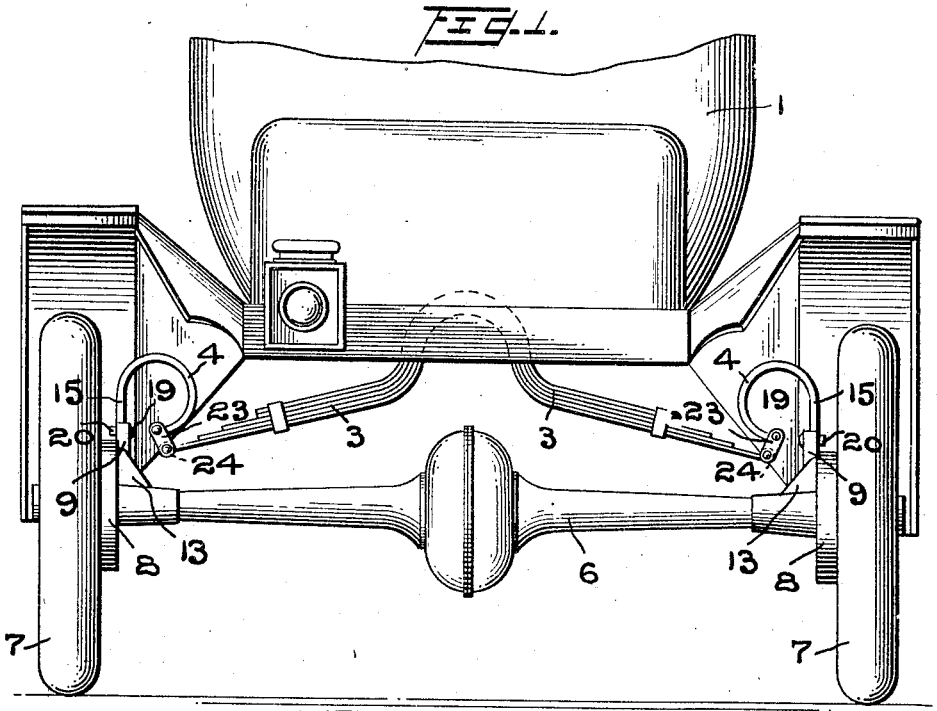
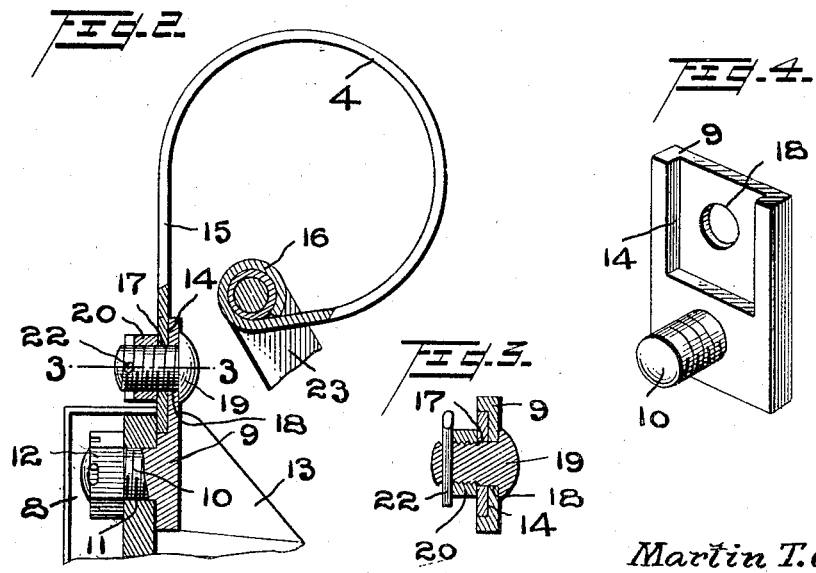
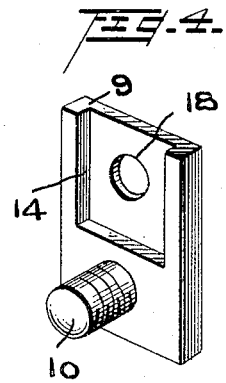
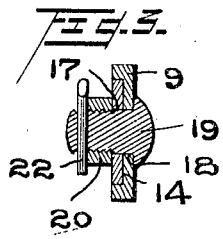
Inventor
Martin T. Convery
By Joshua R. H. Potts
Attorney M. T. CONVERY.
SHOCK ABSORBER.
APPLICATION FILED JUNE 26, 1914.
1,122,694.
Patented Dec. 29, 1914.
2 SHEETS—SHEET 2.
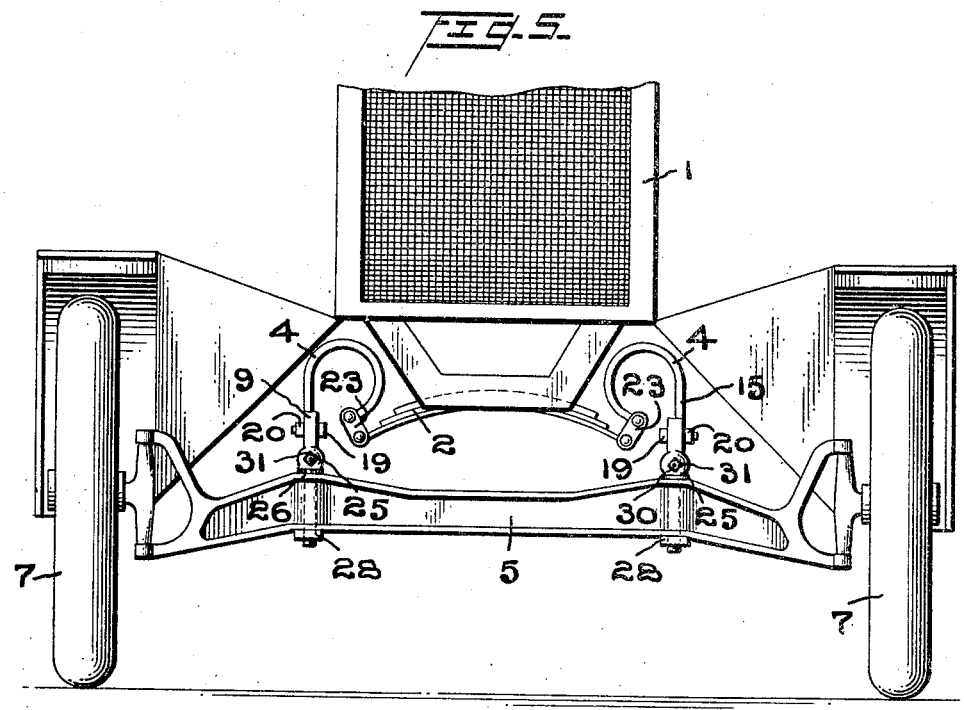
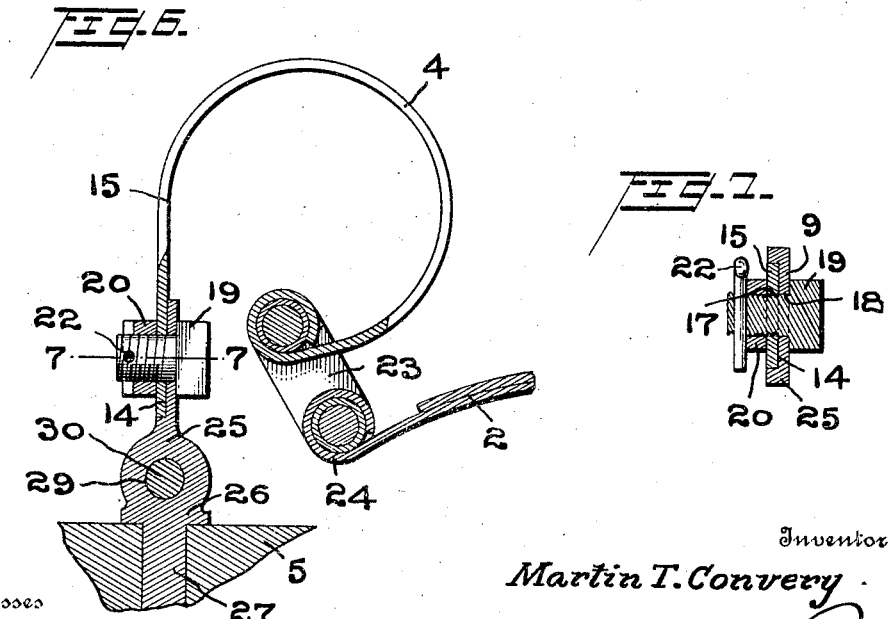
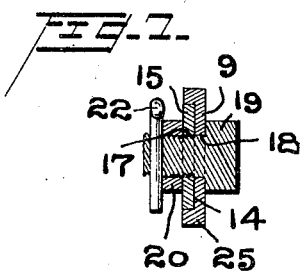
Inventor
Martin T. Convery
By Joshua R. H. Potts
Attorney
Witnesses
L. P. Moyer
C. R. Ziegler

UNITED STATES PATENT OFFICE.

MARTIN T. CONVERY, OF PHILADELPHIA, PENNSYLVANIA.

SHOCK-ABSORBER.

1,122,694.   Specification of Letters Patent.   Patented Dec. 29, 1914.

Application filed June 26, 1914. Serial No. 847,404.

*To all whom it may concern:*

Be it known that I, MARTIN T. CONVERY, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide a shock absorber which is adapted for use in connection with vehicles having transverse springs supporting the body thereof and adapted for connection with the ends of said springs, both at the front and rear of the vehicle.

A further object is to provide a shock absorber of the character stated which is of extremely simple construction, comparatively cheap to manufacture, which can be attached by any one of average intelligence without requiring skilled labor, and which will be strong and durable in use.

With these and other objects in view, the invention consists in certain novel features of construction and combinations and arrangements of parts as will be more fully hereinafter described and pointed out in the claims.

In the accompanying drawings: Figure 1 is a view in elevation of the rear end of an automobile equipped with my improved shock absorbers. Fig. 2 is an enlarged view partly in vertical section and partly in elevation illustrating one of my improved shock absorbers and its supporting bracket. Fig. 3 is a view in section on the line 3—3 of Fig. 2. Fig. 4 is a perspective view of the supporting bracket 9. Fig. 5 is a view similar to Fig. 1 showing in elevation the front end of an automobile illustrating a modified form of bracket which is used to support the shock absorbers at the front end of the vehicle. Fig. 6 is a fragmentary view partly in vertical section and partly in elevation illustrating the supporting bracket of the shock absorber shown in Fig. 5, and Fig. 7 is a view in section on the line 7—7 of Fig. 6.

1 represents the body of an automobile or other similar vehicle supported at its front end upon a transverse spring 2, and at its rear end upon a transverse spring 3, the latter connected by my improved shock absorbers 4 with the front and rear axles 5 and 6 respectively, the latter supported by wheels 7 as shown.

Referring to the construction illustrated in Figs. 1, 2, 3, and 4, in which my improvements are shown in connection with the rear spring of the automobile, 8, 8 represent the ordinary brake cases at the ends of the axle to which brackets 9 are secured and support the shock absorbers 4. Both of these brackets are alike, and the description hereinafter of one will apply alike to both. Each bracket 9 comprises a block of metal of general rectangular form having on its inner face, adjacent one end, an integral screw-threaded stud 10 which projects through an opening 11 in the brake case 8, and is secured by a nut 12 inside the brake case as shown clearly in Fig. 2. The bracket 9 rests between strengthening webs 13 on the inside of the brake case, so that it is held against any possibility of pivotal movement. A rectangular recess 14 is formed in the outer face of the bracket 9 at its upper end, and this recess is of the proper size to accommodate the lower end of the straight portion 15 of my improved shock absorber 4. The shock absorber 4 consists of a bar of spring metal having a comparatively straight portion 15 projecting upwardly from the bracket and then curving inwardly, downwardly and outwardly in approximately the arc of a circle constituting a curved spring with the free end thereof bent forming an eye 16 as clearly shown. The lower end of the straight portion 15, as above stated, snugly fits within the recess 14, and said straight portion and the bracket are provided with registering openings 17 and 18 respectively for the reception of a bolt 19 having a nut 20 clamped thereon and secured by a locking pin 22. When the nut 20 is screwed home, the straight portion 15 of the shock absorber is securely clamped in the recess 14, and is held against pivotal movement in any direction, because the side walls of the recess prevent any such movement. The recess is sufficiently deep to accommodate the vertical portion 15, so that the latter lies flush with the bracket. The shock absorbers 4, at the respective ends of the axle 6, are oppositely positioned, and the eyes 16 of the shock absorbers 4 are connected by the ordinary hangers 23 with eyes 24 on the ends of the spring 3, so that while the spring is permitted its ordinary movements to cushion the body, the shocks and vibrations which would otherwise be transmitted to the body are absorbed by my improved shock absorbers.

In Figs. 5, 6, and 7, I illustrate my improved shock absorbers as employed in connection with the front spring 2 of the vehicle. In this form, the construction is precisely the same as in the form above described, except that the supporting brackets 25 for the front shock absorbers are constructed differently for connection to the front axle 5, hence I have used like reference characters to indicate like parts in both forms of my invention. The brackets 25 have enlarged lower ends 26 which bear upon the upper edge of the axle 5, while the extreme lower portions of the brackets constitute studs 27 which project through the axle and have nuts 28 screwed onto their lower ends. The brackets 26 have openings 29 for the reception of stay rods 30 which have nuts 31 on their outer ends, and at their inner ends are connected to the vehicle frame in any approved manner (not shown) to support the front axle in proper relationship to the frame.

Various other slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a supporting bracket having an angular recess in its free end, a shock absorber comprising a bar of spring metal having a straight portion at one end fitting within the said recess, said bracket and straight portion of the shock absorber having registering openings, a bolt in said openings, a nut on said bolt, said bar at its free end curved in the arc of a circle and adapted to be connected to a spring substantially as described.

2. The combination with a vehicle having a transverse spring supporting the body thereof, of shock absorbers supporting the ends of the spring, said shock absorbers comprising bars of spring metal curved at their upper ends, hangers connecting the curved ends of the bars with the first-mentioned spring, brackets supporting the other ends of the shock absorbers, said brackets having recesses therein receiving the ends of the bars, and devices securing the bars in the recesses, substantially as described.

3. The combination with two brackets having fixed relationship to a vehicle axle, said brackets each having angular recesses in their upper ends, shock absorbers comprising bars of spring metal, said bars at one end fitting the recesses in the brackets, bolts securing the bars in the recesses, said recesses having walls at the edges of the bars, whereby pivotal movement of the bars is prevented, said bars at their free ends curved inwardly, downwardly, and outwardly, and hangers connecting the free ends of said bars with the free ends of the first-mentioned spring, substantially as described.

4. The combination with a vehicle body, a transverse spring supporting the vehicle body, an axle below the spring, and brake cases on the axle, of brackets having integral lugs projected into the brake cases, nuts on the lugs in the brake cases, said brackets having angular recesses in their upper ends, shock absorbers comprising bars of spring metal secured at one end in the recesses and at their free ends curved in the arc of a circle and connected to the free ends of the first-mentioned spring, substantially as described.

In testimony whereof I have signed my name to this specification in the presence of two subscribing witnesses.

MARTIN T. CONVERY.

Witnesses:
L. P. MOYER,
S. W. FOSTER.